(12) United States Patent
Tomoto (10) Patent No.: US 7,819,647 B2
(45) Date of Patent: Oct. 26, 2010

(54) BEAD RING LOCKING MECHANISM OF TIRE VULCANIZER

(75) Inventor: Keiichi Tomoto, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 178 days.

(21) Appl. No.: 12/289,476

(22) Filed: Oct. 29, 2008

(65) Prior Publication Data

US 2009/0142432 A1    Jun. 4, 2009

(30) Foreign Application Priority Data

Nov. 30, 2007    (JP) ............................. 2007-311711

(51) Int. Cl.
*B29C 35/02*    (2006.01)
(52) U.S. Cl. .......................................... 425/36; 425/38
(58) Field of Classification Search .................. 425/36, 425/38
See application file for complete search history.

(56) References Cited

U.S. PATENT DOCUMENTS 3,171,162 A * 3/1965 Soderquist ................. 425/36
5,409,361 A * 4/1995 Ichikawa et al. ............... 425/48
5,522,716 A * 6/1996 Ureshino ..................... 425/48

FOREIGN PATENT DOCUMENTS

| EP | 0 950 486 A2 | 10/1999 |
| GB | 791841 A | 3/1958 |
| JP | S56-166040 A | 12/1981 |
| JP | H05-62046 B2 | 9/1993 |
| JP | H11-114965 A | 4/1999 |

* cited by examiner

*Primary Examiner*—James Mackey
(74) *Attorney, Agent, or Firm*—Benjamin Hauptman; Manabu Kanesaka; Kenneth Berner (57) ABSTRACT

A bead ring locking mechanism restricts the relative turning of a tubular lifter moved upward or downward on the outside of a central mechanism outer casing with respect to an annular bead ring attached to the outer circumference of the lifter to form a part of a die. The locking mechanism includes a stopper member installed at the bead ring and attached so as to move back and forth with respect to the lifter, and an actuating member which moves the stopper member from the bead ring to the lifter. A recessed portion is formed at the lifter, a raised portion is formed at the stopper member, and the raised portion is fitted into the recessed portion by pressing the stopper member to the lifter using the actuating member.

6 Claims, 6 Drawing Sheets

BEAD RING LOCKING MECHANISM OF TIRE VULCANIZER

CROSS-REFERENCE TO RELATED APPLICATIONS

Priority is claimed on Japanese Patent Application No. 2007-311711 filed on Nov. 30, 2007, the content of which is incorporated herein by reference.

BACKGROUND OF THE INVENTION

1. Field of the Invention

The present invention relates to a tire vulcanizer and in particular to a bead ring locking mechanism for restricting the turning of a bead ring with respect to a lifter.

2. Background Art

For example, a tire vulcanizer is disclosed in Japanese Unexamined Patent Application, First Publication No. H11-114965. This tire vulcanizer is equipped with a base for fixing a die via a platen, a central mechanism outer casing fixed to the base, a lifter arranged inside the central mechanism outer casing and moved upward or downward by a lower cylinder, and a bead ring attached to the upper end portion of the lifter to form a part of the die. In the tire vulcanizer, a tire is vulcanized inside the die.

A bayonet mechanism for allowing the bead ring to be engaged with the lifter is installed at the upper end portion of the lifter. The bayonet mechanism allows the bead ring to be engaged with the lifter in the axial direction, turning the bead ring in the circumferential direction when the lifter is moved upward, thus making it possible to release the engagement. Thereby, it is possible to remove the bead ring.

Figure 7:
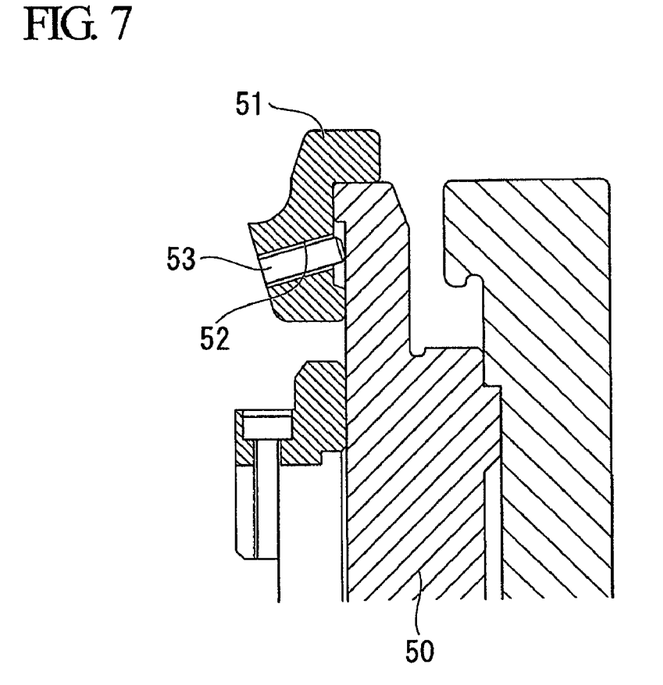
FIG. 7 is a cross sectional view showing a conventional constitution of fixing a lower bead ring to a lifter.

In a tire vulcanizer having the above-described bayonet mechanism, in order to prevent the engagement of the bead ring with the lifter in the axial direction from releasing by turning the bead ring in the circumferential direction from a state of being engaged with the lifter in the axial direction, a set screw is used to stop the turning of the bead ring. Specifically, as shown in FIG. 7, an annular lower bead ring 51 is attached to the outer circumferential face of a tubular lifter 50. Then, the lower bead ring 51 is fixed to the lifter 50 by screwing the set screw 53 into an attachment hole 52 of the lower bead ring 51.

However, the lower bead ring 51 which forms a part of the die must be frequently exchanged in accordance with each time tires to be manufactured are changed for the type and the size. In order to replace the lower bead ring 51, it is necessary to frequently fasten or loosen the set screw 53. After repeating this operation, the fastening of the set screw 53 into the attachment hole 52 gradually loosens, and the lower bead ring 51 is turned with respect to the lifter 50 during the replacement of the lower bead ring 51. Therefore, the lower bead ring 51 must be checked frequently, sometimes the ring 51 must be replaced.

Further, since the leading end of the set screw 53 fastened on the lower bead ring 51 is in point contact with the outer circumference face of the lifter 50, a similar failure as that described above may take place, if the set screw 53 is not sufficiently fastened.

An object of the present invention is to provide a bead ring locking mechanism of a tire vulcanizer capable of reliably stopping the turning of a lower bead ring with respect to a lifter and also replacing the lower bead ring easily.

SUMMARY OF THE INVENTION

The bead ring locking mechanism of the present invention restricts the relative turning of a tubular lifter moved upward or downward on the outside of a central mechanism outer casing with respect to an annular bead ring attached to the outer circumference of the lifter to form a part of a die. The bead ring locking mechanism is provided with a stopper member installed at one of the bead ring and the lifter and attached so as to move back and forth with respect to the other of the bead ring and the lifter, and an actuating member which moves the stopper member from one of the bead ring and the lifter to the other. A recessed portion is formed at the other of the bead ring and the lifter, and a raised portion is formed at the stopper member. The raised portion is fitted into the recessed portion by pressing the stopper member to the other of the bead ring and the lifter using the actuating member.

In the above-constituted bead ring locking mechanism, a stopper member attached to one of the bead ring and the lifter is pressed to the other of the bead ring and lifter by a force of the actuating member. Then, when a raised portion of the stopper member is in contact with a recessed portion formed at the bead ring or the lifter in the course of making a circumferential turning of the bead ring or the lifter on the axis as a center, the raised portion of the stopper member is fitted into the recessed portion. Thereby, the bead ring or the lifter is restricted from being turned axially.

Screws such as a set screw are not used for stopping the turning of the bead ring, but the stopper member is used to restrict the turning of the bead ring. Therefore, there is no chance that the raised portion is removed from the recessed portion, unless an external force is applied to a direction at which the stopper member is retracted against the force of the actuating member. As a result, it is possible to reliably stop the turning of the bead ring with respect to the lifter by using the stopper member.

In the bead ring locking mechanism of the present invention, the stopper member may be installed at one of the bead ring and the lifter so as to move back and forth along the axial direction thereof. Further, the stopper member may be allowed to move back and forth between a retracted position at which the leading end of the stopper member is in contact with a step portion provided on the other of the bead ring and the lifter and a fitted position at which the leading end thereof fits into the recessed portion arranged at the step portion.

In the above-constituted bead ring locking mechanism, while the raised portion of the stopper member is at the retracted position which is in contact with the step portion provided at the other of the bead ring and the lifter, the raised portion only slides along the step portion, even if moved by the actuating member. Therefore, the bead ring is allowed to turn with respect to the lifter. However, when the bead ring is turned with respect to the lifter and the raised portion of the stopper member is fitted into the recessed portion formed at the step portion, the bead ring is restricted from being turned with respect to the lifter.

Further, the stopper member is lifted with a tool or the like against the force of the actuating member in a state that the raised portion is fitted into the recessed portion, thereby the raised portion is easily removed from the recessed portion. Therefore, it is possible to easily remove the bead ring from the lifter and replace the bead ring.

In the bead ring locking mechanism of the present invention, the stopper member may be installed at the bead ring.

In the above-constituted bead ring locking mechanism, the stopper member having the raised portion is installed at the bead ring, by which the lifter is free from any projecting portions. Therefore, it is possible to smoothly move the lifter upward or downward.

In the bead ring locking mechanism of the present invention, the bead ring may be provided with a stopper attachment groove. The upper part or the lower part of the stopper attachment groove is provided with an opening, and the outer face of the stopper attachment groove is provided with an end opening. Further, the stopper member may be attached to the bead ring so that the base end of the stopper member is inserted into the stopper attachment groove through the end opening and also the raised portion of the stopper member is projected from the upper opening or the lower opening.

In the above-constituted bead ring locking mechanism, the stopper member can be attached to the bead ring only by inserting the base end of the stopper member into the stopper attachment groove from the end opening of the bead ring.

Further, the stopper member inserted into the stopper attachment groove is arranged in such a manner that the raised portion at the leading end thereof is projected from the upper opening or the lower opening of the stopper attachment groove. Thereby, the raised portion of the stopper member can be fitted into the recessed portion of the lifter.

In the bead ring locking mechanism of the present invention, the inner width of the stopper attachment groove may be formed greater than the width of the end opening. Further, the base end of the stopper member may be formed greater than the raised portion in accordance with the inner width of the stopper attachment groove.

In the above-constituted bead ring locking mechanism, the base end of the stopper member is fitted into the stopper attachment groove of the bead ring and made stable.

The vulcanizer of the present invention is provided with a tubular lifter that moves upward or downward on the outside of the central mechanism outer casing, an annular bead ring attached on the outer circumference of the lifter to form a part of a die, and a bead ring locking mechanism which restricts the lifter and the bead ring from being turned relatively. The bead ring locking mechanism is provided with a stopper member installed on one of the bead ring and the lifter and attached so as to move back and forth with respect to the other of the bead ring and the lifter, and an actuating member which moves the stopper member from one of the bead ring and the lifter to the other. A recessed portion is formed on the other of the bead ring and the lifter, and a raised portion is formed at the stopper member. The raised portion is fitted into the recessed portion by pressing the stopper member to the other of the bead ring and the lifter using the actuating member.

According to the present invention, it is possible to reliably stop the turning of the lower bead ring with respect to the lifter and also replace the lower bead ring easily.

PREFERRED EMBODIMENTS

Hereinafter, an explanation will be made for an embodiment of the present invention by referring to FIG. 1 to FIG. 6.

Figure 1:
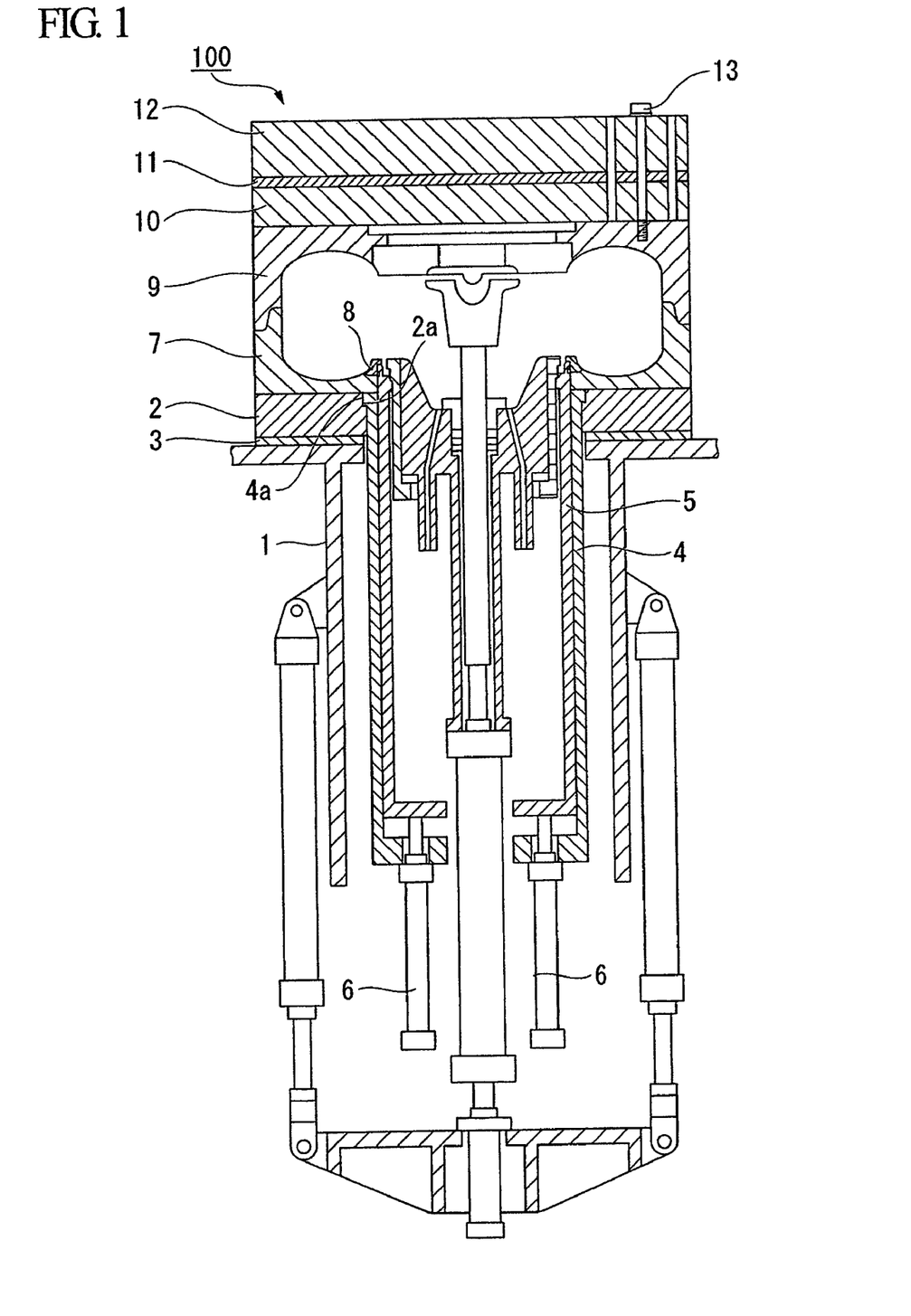
FIG. 1 is a cross sectional view showing a tire vulcanizer having the bead ring locking mechanism of the present invention.

FIG. 1 is a front cross sectional view showing a vulcanizer 100 in its entirety. A lower platen 2 is fixed with a bolt (not illustrated) on the upper face of a base 1 via a heat insulating material 3. Further, a outer casing 4 which forms a central mechanism of the vulcanizer 100 is arranged at the center of the base 1 and the upper end portion is inserted into a center hole of the lower platen 2 by which an upper flange portion 4a is engaged with the inner face upper part 2a of the lower platen 2. Still further, a tubular lifter 5 is inserted into the inner circumferential face of the outer casing 4 so as to slide freely. The lifter 5 is moved upward or downward by a cylinder 6 disposed at the lower part of the outer casing 4.

A lower die 7 is arranged on the lower platen 2. A lower bead ring 8 which functions as a part of the die is engaged with the inner circumference of the lower die 7. The lower bead ring 8 is arranged on the outer circumference of the lifter 5 and annularly formed so as to be fitted into the cylindrical lifter 5. Further, a fitting recessed portion 8A is formed on the inner circumferential face of the bead ring 8, and a fitting raised portion 5A is formed on the outer circumferential face of the lifter 5. The fitting recessed portion 8A and the fitting raised portion 5A are arranged along the circumferential direction (the direction given by the arrow A to B) at which the lower bead ring 8 is moved (refer to FIG. 3 and FIG. 5). Then, in a state that the fitting raised portion 5A of the lifter 5 is fitted into the fitting recessed portion 8A of the lower bead ring 8, the lower bead ring 8 turns freely with respect to the lifter 5 in the circumferential direction (the direction given by the arrow A to B).

Figure 3:
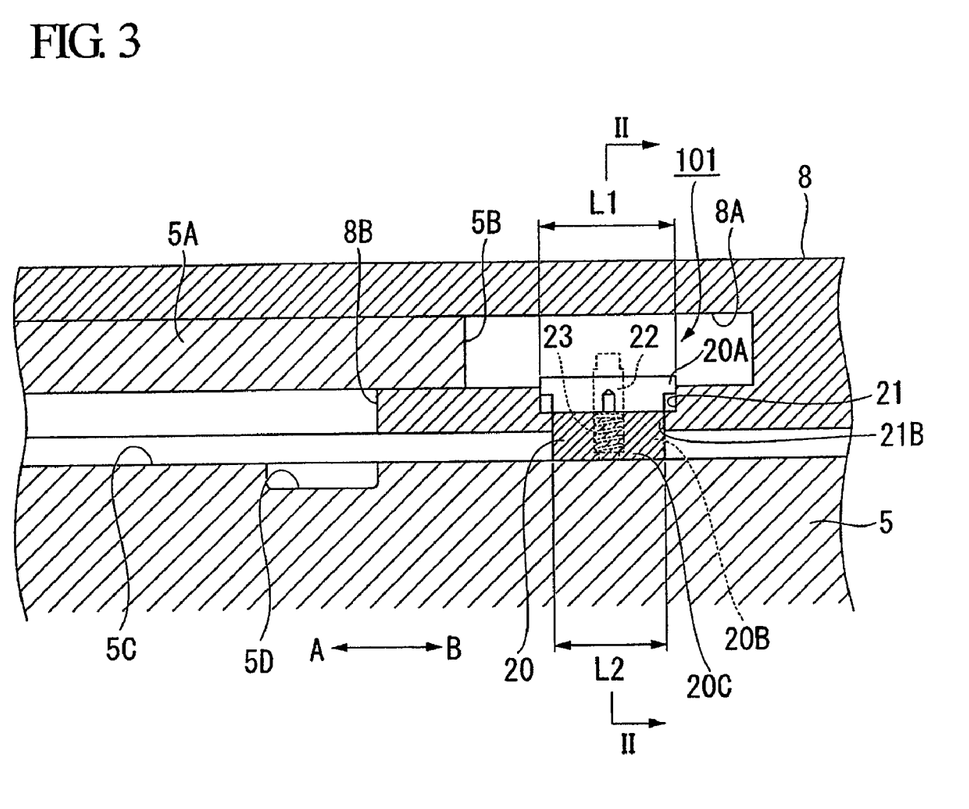
FIG. 3 is a cross sectional view showing the bead ring locking mechanism given in FIG. 2 which is taken along the line III to III.
Figure 4:
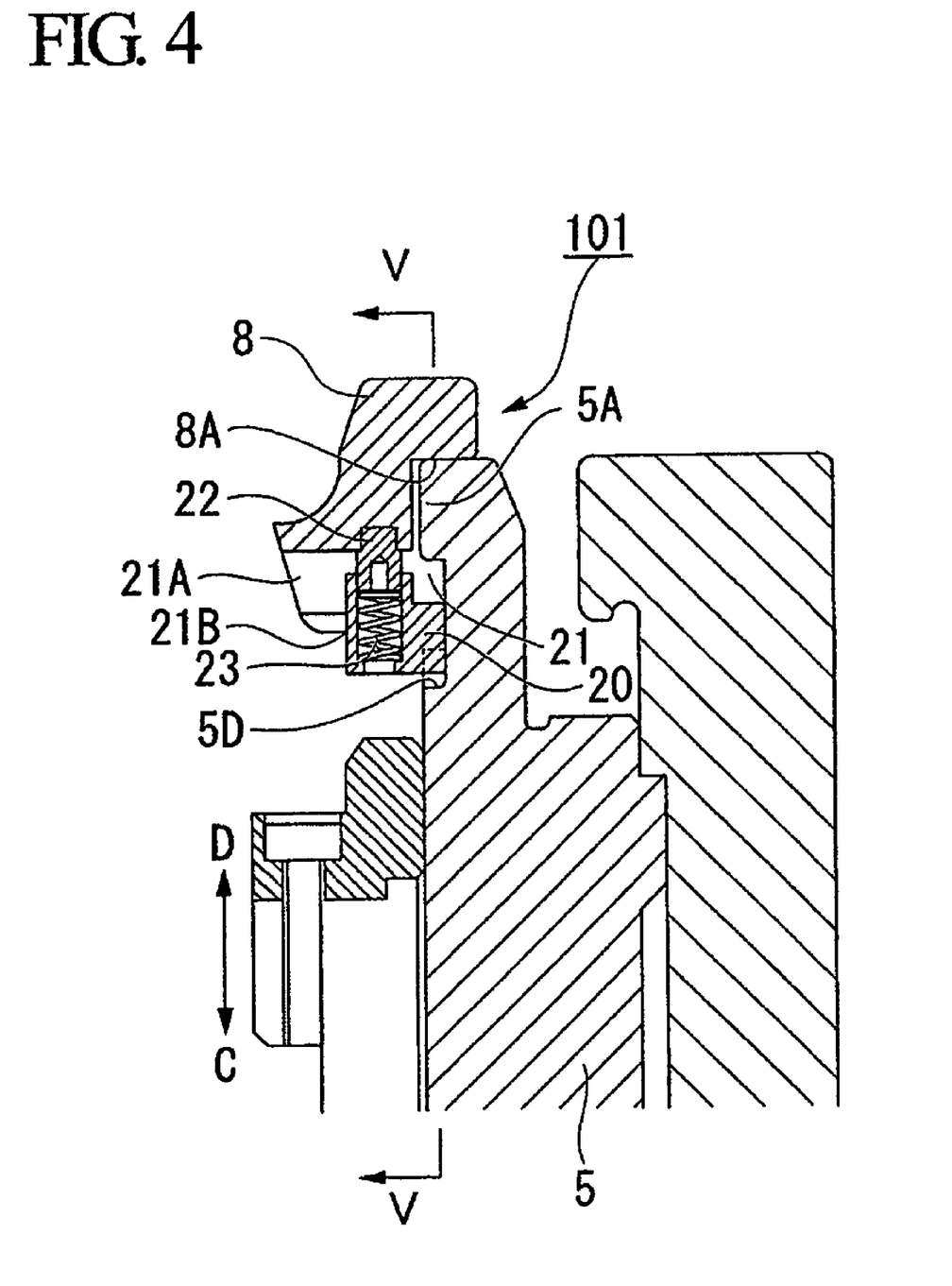
FIG. 4 is cross sectional view showing a main section of the bead ring locking mechanism in a state that the raised portion of the stopper member is fitted into the recessed portion, and in particular showing the bead ring locking mechanism given in FIG. 5 which is taken along the line IV to IV.
Figure 5:
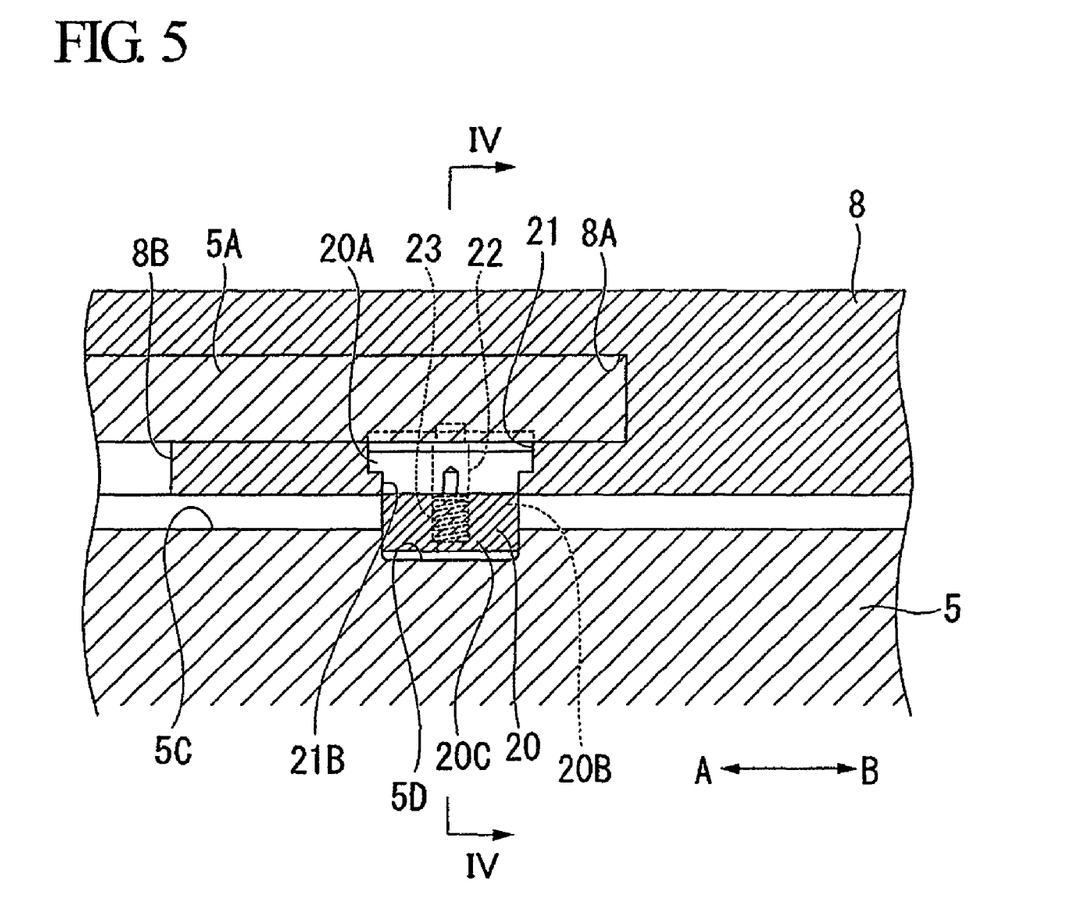
FIG. 5 is a cross sectional view showing the bead ring locking mechanism given in FIG. 4 which is taken along the line V to V.

Further, a notch portion 8B is formed at the fitting recessed portion 8A of the lower bead ring 8, and a notch portion 5B is formed at the fitting raised portion 5A of the lifter 5. Then, the lower bead ring 8 is turned with respect to the lifter 5 so that the notch portion 8B is in alignment with the notch portion 5B, thereby releasing the engagement of the fitting recessed portion 8A with the fitting raised portion 5A to remove the lower bead ring 8 from the lifter 5. It is, thereby, possible to replace the lower bead ring 8. Further, in a case where the lower bead ring 8 is turned in the direction given in the arrow A as shown in FIG. 3 to FIG. 5, the fitting recessed portion 8A is completely engaged with the fitting raised portion 5A, by which the lower bead ring 8 is restricted from being further turned and the engagement of the lower bead ring 8 with the lifter 5 in the axial direction is held. In other words, a bayonet mechanism is constituted with the fitting raised portion 5A, the notch portion 5B, the fitting recessed portion 8A and the notch portion 8B.

On the other hand, the upper platen 10 to which an upper die 9 is fixed is integrally bonded with a bolt or the like to a bolster plate 12 moved upward or downward by a known hoisting mechanism (not illustrated) via the heat insulating material 11. Further, the upper die 9 is fixed with a bolt 13 to the upper platen 10. It is noted that other constituents of the center mechanism for the tire vulcanizer are the same as those used in a conventional mechanism, the explanation of which will be omitted here.

Next, an explanation will be made by referring to FIG. 2 to FIG. 5 for a bead ring locking mechanism 101 for stopping the turning of the lower bead ring 8 with respect to the lifter 5 in the circumferential direction (the direction given by the arrow A to B). A step portion 5C along the circumferential direction (the direction given by the arrow A to B) below the fitting raised portion 5A is formed on the lifter 5, and a recessed portion 5D which is recessed in the axial direction (the direction given by the arrow C to D) is formed at a predetermined position of the step portion 5C. The raised portion of a stopper main body is fitted into the recessed portion 5D.

Figure 6:
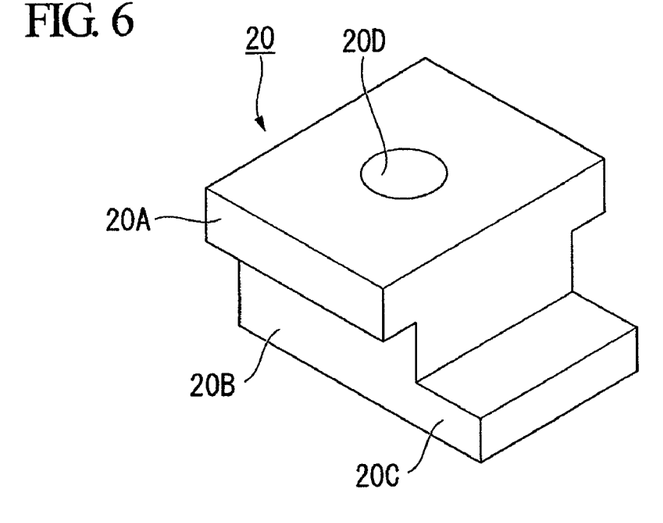
FIG. 6 is a perspective view showing the stopper member included in the bead ring locking mechanism.

Further, a stopper attachment groove 21 on which a stopper member 20 is attached is installed below the lower bead ring 8. As shown in FIG. 6, the upper part of the stopper member 20 is provided with a wide base end 20A, and the lower part of the stopper member 20 is provided with a leading end 20B which is narrower than the base end 20A, and thereby the stopper member 20 is formed substantially in a T-shape. A raised portion 20C is installed at the leading end 20B in a direction orthogonal to the direction at which the base end 20A is extended. Further, an attachment hole 20D for attaching a compression spring 23 is formed vertically at the center of the stopper member 20.

The stopper attachment groove 21 to which the stopper member 20 is attached is formed according to a configuration of the stopper member 20 so as to be substantially in a cross section T-shape. The upper dimension (L1 given in FIG. 3) of the stopper attachment groove 21 is formed more widely than an end opening 21A (L2 given in FIG. 3) formed on the outer face of the lower bead ring 8. In a case where the stopper member 20 is attached to the above stopper attachment groove 21, the base end 20A of the stopper member 20 is arranged at a wider upper part of stopper attachment groove 21, and also the leading end 20B of the stopper member 20 is arranged on the lower opening 21B of the stopper attachment groove 21. Further, the stopper attachment groove 21 at which the base end 20A of the stopper member 20 is arranged is formed with sufficient space, so that the loaded stopper member 20 can be moved vertically. Specifically, the depth of the interior of the stopper attachment groove 21 is sufficiently greater than the thickness of the base end 20A. Thereby, the stopper member 20 loaded into the stopper attachment groove 21 can move vertically without any difficulty.

Figure 2:
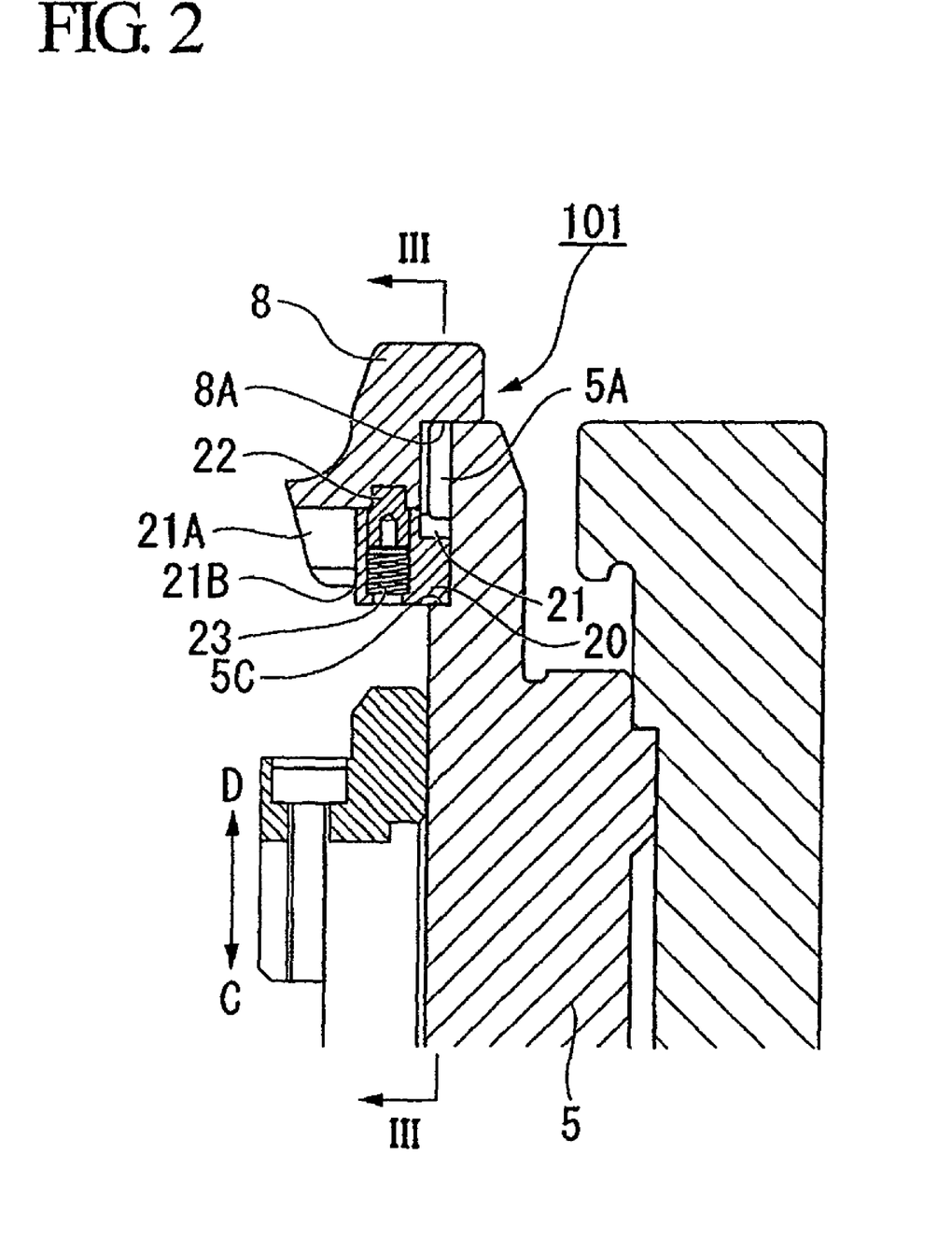
FIG. 2 is a cross sectional view showing a main section of the bead ring locking mechanism in a state that the raised portion of the stopper member is not fitted into the recessed portion, and in particular showing the bead ring locking mechanism given in FIG. 3 which is taken along the line II to II.

On the other hand, as shown in FIG. 2 and FIG. 4, a compression spring 23 as an actuating member is attached via a positioning pin 22 inside the attachment hole 20D formed at the center of the stopper member 20. The upper part of the positioning pin 22 is screwed with the lower bead ring 8, and the lower part of the positioning pin 22 is provided with the compression spring 23 for pressing the stopper member 20 in the downward direction (that is, the axial direction given by the arrow C). A force generated by the compression spring 23 is applied to the stopper member 20 in the direction given by the arrow C, and thereby the raised portion 20C of the stopper member 20 arranged inside the stopper attachment groove 21 is projected from the lower opening 21B of the stopper attachment groove 21 to the downward direction. The raised portion 20C of the stopper member 20 is allowed to move back and forth between a retracted position (refer to FIG. 3) at which it is in contact with the upper face of the step portion 5C of the lifter 5 and a fitted position (refer to FIG. 5) at which it advances into the recessed portion 5D formed at the predetermined position of the step portion 5C.

In a case where the lower bead ring 8 is removed from the lifter 5, the lifter 5 is moved upward, by which the lower bead ring 8 is allowed to sit above at a position deviated from the lower die (not illustrated). When the lower die is removed, the lower face of the lower bead ring 8 is exposed. Thereby, the stopper member 20 is also exposed. If the exposed stopper member 20 is lifted with a screwdriver, it is possible to remove the raised portion 20C of the stopper member 20 from the recessed portion 5D of the lifter 5.

In the above-constituted bead ring locking mechanism 101, as shown in FIG. 2 and FIG. 3, the lower bead ring 8 is attached to the outer circumferential face of the lifter 5 via the fitting recessed portion 8A and the fitting raised portion 5A, and then the lower bead ring 8 is turned in the circumferential direction (the direction given by the arrow A) with respect to the lifter 5. In an initial stage at which the lower bead ring 8 is attached to the lifter 5, the stopper member 20 inside the lower bead ring 8 is pressed to the upper face of the step portion 5C of the lifter 5. When the lower bead ring 8 is turned in the circumferential direction indicated by the arrow A with respect to the lifter 5, the stopper member 20 moves in the circumferential direction while the lower face of the raised portion 20C is sliding on the step portion 5C of the lifter 5.

Thereafter, in a case where the lower bead ring 8 is turned in the direction indicated by the arrow A as shown in FIG. 3 to FIG. 5, the fitting recessed portion 8A is completely meshed and engaged with the fitting raised portion 5A, thereby the lower bead ring 8 is restricted from being further turned and the lower bead ring 8 is retained by the lifter 5 (the fitting recessed portion 8A and the fitting raised portion 5A function as a bayonet mechanism). In this case, the raised portion 20C of the stopper member 20 is vertically kept in alignment with the recessed portion 5D of the step portion 5C of the lower bead ring 8. As shown in FIG. 4 and FIG. 5, the raised portion 20C at the leading end of the stopper member 20 advances into the recessed portion 5D of the lower bead ring 8 and is fitted thereinto due to the force of the compression spring 23. Thereby, the lower bead ring 8 is disabled from being turned axially.

In the above-constituted bead ring locking mechanism 101, screws such as a set screw are not used for stopping the turning of the lower bead ring 8, but the stopper member 20 is allowed to move back and forth, thereby restricting the turning of the lower bead ring 8. Therefore, there is no chance of removal, unless an external force is given to a direction at which the stopper member 20 is retracted against the force of the compression spring 23. As a result, the stopper member 20 can be used to reliably stop the turning of the lower bead ring 8 with respect to the lifter 5. It is also possible to easily exchange the lower bead ring 8.

Further, in the above-described bead ring locking mechanism 101, the raised portion 20C of the stopper member 20 inside the lower bead ring 8 is fitted into the recessed portion 5D of the lifter 5 by the force of the compression spring 23. Therefore, if the stopper member 20 is lifted with a tool against the force of the compression spring 23, the raised portion 20C is easily removed from the recessed portion 5D. It is, thereby, possible to easily remove the lower bead ring 8 from the lifter 5 and replace it.

Still further, in the above-described bead ring locking mechanism 101, the stopper attachment groove 21 is formed at the lower bead ring 8. The stopper attachment groove 12 is provided with the end opening 21A opened on the outer face of the lower bead ring 8. The stopper member 20 is attached to the lower bead ring 8 so that the base end 20A is inserted into the stopper attachment groove 21 through the end opening 21A and also the raised portion 20C is projected from the lower opening 21B. Thereby, the base end 20A of the stopper member 20 is only inserted into the stopper attachment groove 21 from the end opening 21A of the lower bead ring 8, thus making it possible to attach the stopper member 20 to the lower bead ring 8.

Still further, in the above-described bead ring locking mechanism 101, the inner width of the stopper attachment groove 21 is formed greater than the width of the end opening 21A. On the other hand, the leading end 20B of the stopper member 20 is formed greater than the raised portion 20C, according to the width of the stopper attachment groove 21. Thereby, the base end 20A of the stopper member 20 is fitted into the stopper attachment groove 21 of the lower bead ring 8 and made stable.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

In the above embodiment, the stopper attachment groove 21 is formed on the lower bead ring 8. The stopper member 20 is accommodated inside the stopper attachment groove 21 and the raised portion 20C of the stopper member 20 is fitted into the recessed portion 5D of the lifter 5. However, the stopper attachment groove which accommodates the stopper member may be formed on the lifter 5, and the recessed portion which is fitted with the raised portion 20C of the stopper member 20 may be formed on the lower bead ring 8.

The lifter 5 is formed in a cylindrical shape but may be formed substantially in a tubular shape. Further, the lower bead ring 8 is formed in a cylindrical annular shape but may be formed substantially in an annular shape.

In the above embodiment, the raised portion 20C of the stopper member 20 is projected from the lower opening 21B of the stopper attachment groove 21. However, the raised portion 20C of the stopper member 20 may be projected from an opening formed at an upper part of the stopper attachment groove 21 and fitted into the recessed portion 5D of the lifter 5.

In the above embodiment, the stopper member 20 and the stopper attachment groove 21 are substantially formed in a T-shape with each other. However, for example, the stopper member 20 may be formed in a dovetail shape and the stopper attachment groove 21 may be given as a dovetail groove.

What is claimed is:

1. A bead ring locking mechanism of a tire vulcanizer which restricts the relative turning of a tubular lifter moved upward or downward on the outside of a central mechanism outer casing with respect to an annular bead ring attached to the outer circumference of the lifter to form a part of a die, the bead ring locking mechanism comprising:
   a stopper member installed at one of the bead ring and the lifter and attached so as to move back and forth with respect to the other of the bead ring and the lifter; and
   an actuating member which moves the stopper member from one of the bead ring and the lifter to the other; wherein
   a recessed portion is formed at the other of the bead ring and the lifter,
   a raised portion is formed at the stopper member, and
   the raised portion is fitted into the recessed portion by pressing the stopper member to the other of the bead ring and the lifter using the actuating member.

2. The bead ring locking mechanism of the tire vulcanizer according to claim 1, wherein
   the stopper member is installed at one of the bead ring and the lifter so as to move back and forth along the axial direction thereof, and
   the stopper member is allowed to move back and forth between a retracted position at which the leading end of the stopper member is in contact with a step portion provided on the other of the bead ring and the lifter and a fitted position at which the leading end thereof fits into the recessed portion arranged at the step portion.

3. The bead ring locking mechanism of the tire vulcanizer according to claim 1, wherein
   the stopper member is installed on the bead ring.

4. The bead ring locking mechanism of the tire vulcanizer according to claim 3, wherein
   the bead ring is provided with a stopper attachment groove,
   the upper part or the lower part of the stopper attachment groove is provided with an opening,
   the outer face of the stopper attachment groove is provided with an end opening, and
   the stopper member is attached to the bead ring so that the base end of the stopper member is inserted into the stopper attachment groove through the end opening and the raised portion of the stopper member is projected from the upper opening or the lower opening.

5. The bead ring locking mechanism of the tire vulcanizer according to claim 4, wherein
   the inner width of the stopper attachment groove is formed greater than the width of the end opening, and
   the base end of the stopper member is formed greater than the raised portion in accordance with the inner width of the stopper attachment groove.

6. A tire vulcanizer comprising:
   a tubular lifter that moves upward or downward on the outside of a central mechanism outer casing;
   an annular bead ring attached on the outer circumference of the lifter to form a part of a die; and
   a bead ring locking mechanism which restricts the lifter and the bead ring from being turned relatively, wherein the bead ring locking mechanism is provided with
   a stopper member installed on one of the bead ring and the lifter and attached so as to move back and forth with respect to the other of the bead ring and the lifter, and
   an actuating member which moves the stopper member from one of the bead ring and the lifter to the other, wherein
   a recessed portion is formed on the other of the bead ring and the lifter,
   a raised portion is formed at the stopper member, and
   the raised portion is fitted into the recessed portion by pressing the stopper member to the other of the bead ring and the lifter using the actuating member.

* * * * *

UNITED STATES PATENT AND TRADEMARK OFFICE
CERTIFICATE OF CORRECTION

| | | |
|---|---|---|
| PATENT NO. | : 7,819,647 B2 | Page 1 of 1 |
| APPLICATION NO. | : 12/289476 | |
| DATED | : October 26, 2010 | |
| INVENTOR(S) | : Keiichi Tomoto | |

It is certified that error appears in the above-identified patent and that said Letters Patent is hereby corrected as shown below:

Title Page, Item (57); Please change ABSTRACT, line 2, "a tubular lifter moved upward or downward on the outside" to --a tubular lifter moved upward or downward on the inside--.

Please change column 2, line 8, "on the outside of a central mechanism outer" to --on the inside of a central mechanism outer--.

Please change column 7, line 58, "upward or downward on the outside of a central mechanism" to --upward or downward on the inside of a central mechanism--.

Signed and Sealed this
Sixteenth Day of October, 2012

David J. Kappos
*Director of the United States Patent and Trademark Office*